No. 616,373. Patented Dec. 20, 1898.
W. B. UPTON.
MORTAR MAKING MACHINE.
(Application filed June 22, 1897.)
(No Model.) 6 Sheets—Sheet 1.

Witnesses:
L. C. Hills.
A. L. Hough

Inventor:
William B. Upton
by Franklin D. Hoy Atty.

No. 616,373. Patented Dec. 20, 1898.
W. B. UPTON.
MORTAR MAKING MACHINE.
(Application filed June 22, 1897.)

(No Model.) 6 Sheets—Sheet 3.

Witnesses:
L. C. Hills
A. L. Hough

Inventor:
William B. Upton,
by Franklin H. Hough Atty.

No. 616,373. Patented Dec. 20, 1898.
W. B. UPTON.
MORTAR MAKING MACHINE.
(Application filed June 22, 1897.)
(No Model.) 6 Sheets—Sheet 4.

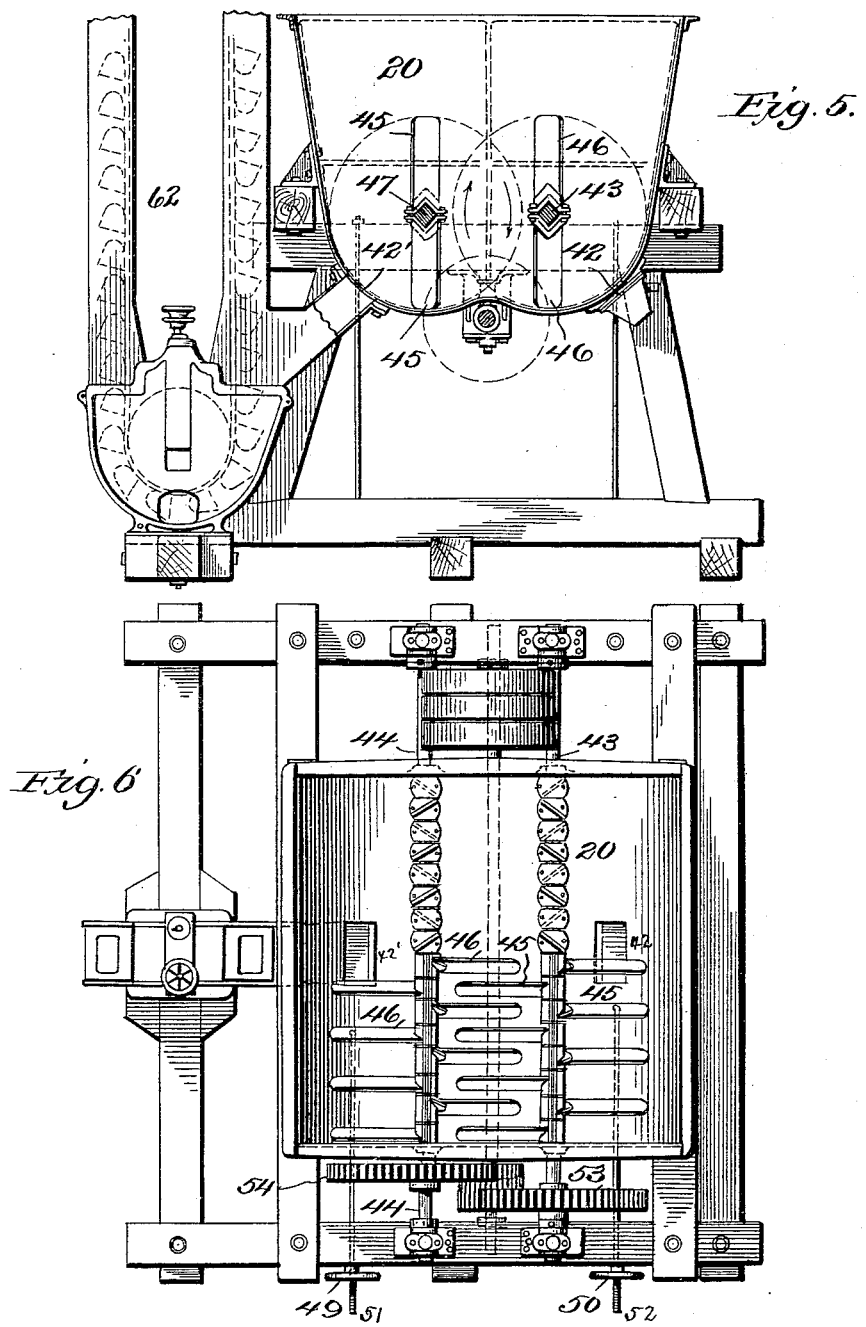

No. 616,373. Patented Dec. 20, 1898.
W. B. UPTON.
MORTAR MAKING MACHINE.
(Application filed June 22, 1897.)
(No Model.) 6 Sheets—Sheet 6.
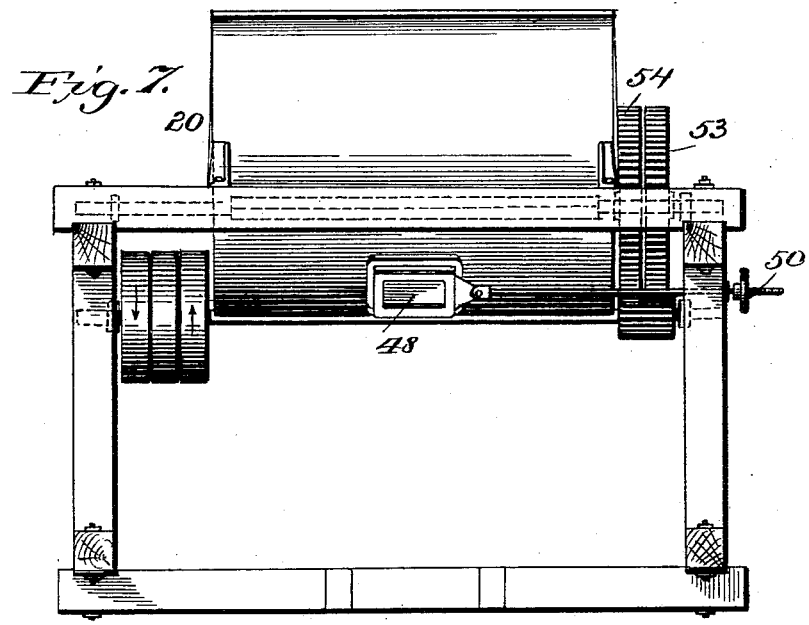
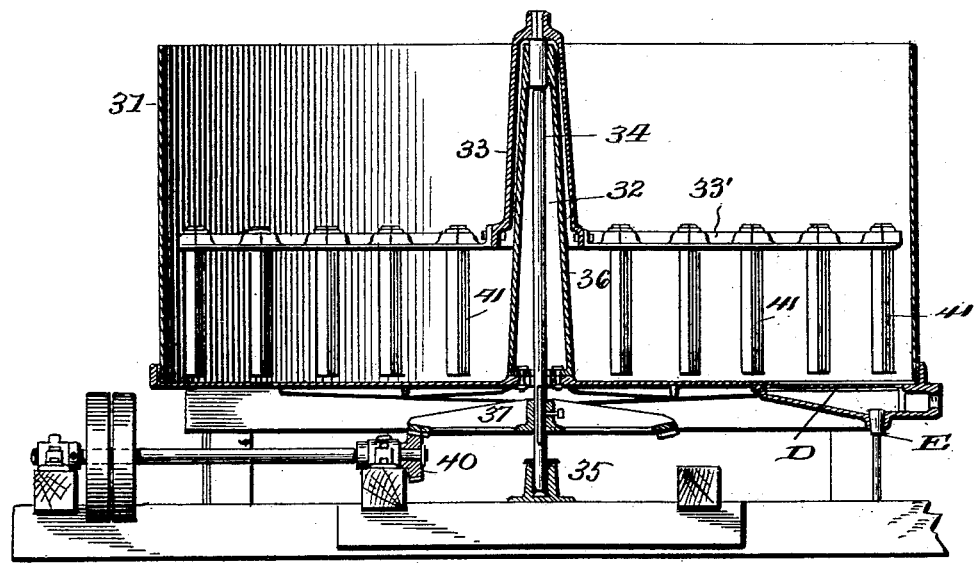

UNITED STATES PATENT OFFICE.

WILLIAM B. UPTON, OF WASHINGTON, DISTRICT OF COLUMBIA.

MORTAR-MAKING MACHINE.

SPECIFICATION forming part of Letters Patent No. 616,373, dated December 20, 1898.

Application filed June 22, 1897. Serial No. 641,816. (No model.)

*To all whom it may concern:*

Be it known that I, WILLIAM B. UPTON, a citizen of the United States, residing at Washington, in the District of Columbia, have invented certain new and useful Improvements in Mortar-Making Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.
This invention relates to certain new and useful improvements in the art of making common lime-mortar; and it consists, essentially, in the apparatus employed, the same consisting of a complete set of machinery adapted for use in handling, proportioning, and mixing the ingredients of the mortar, and thereby economically obtaining a constant, uniform, and superior product.

My invention consists in the arrangement and combination of parts, all as more fully hereinafter described.

The invention is clearly illustrated in the accompanying drawings, which, with the letters and figures of reference marked thereon, form a part of this specification, like letters and figures of reference indicating the same parts through the several views, and in which—

Figure 1:
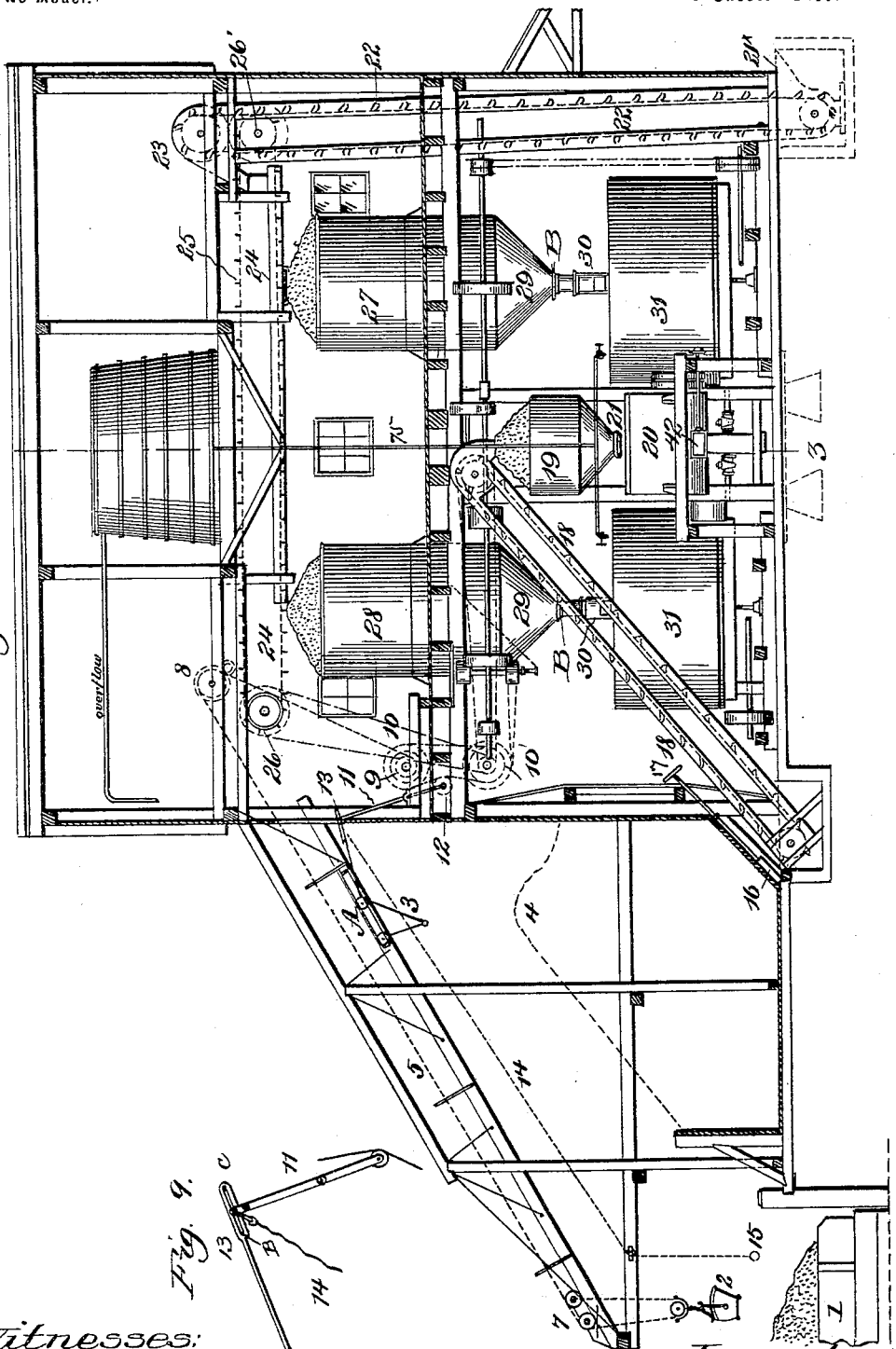
Figure 2:
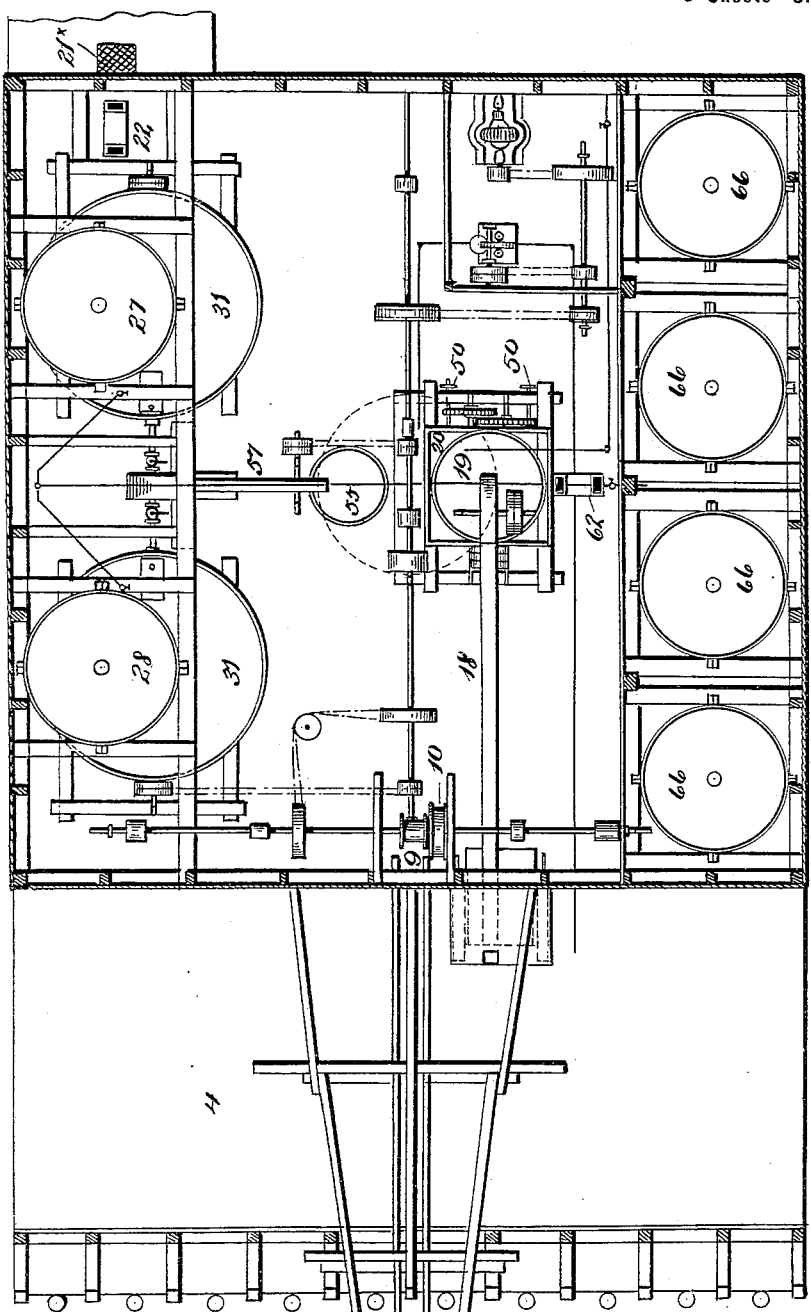
Figure 3:
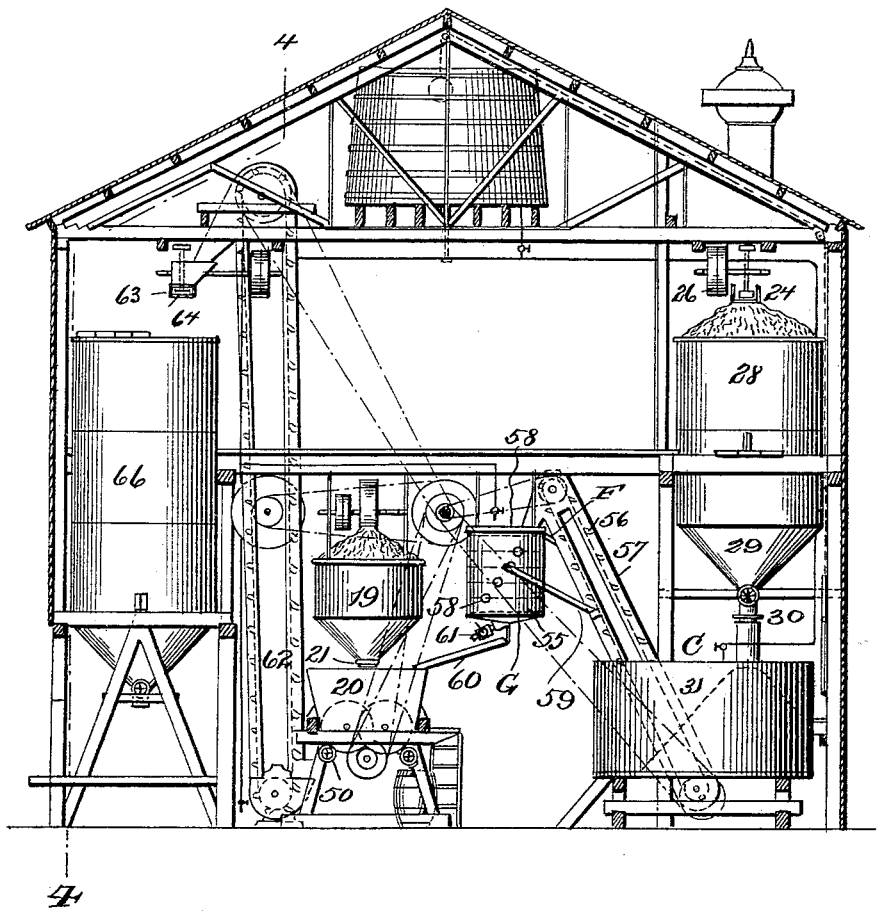
Figure 4:
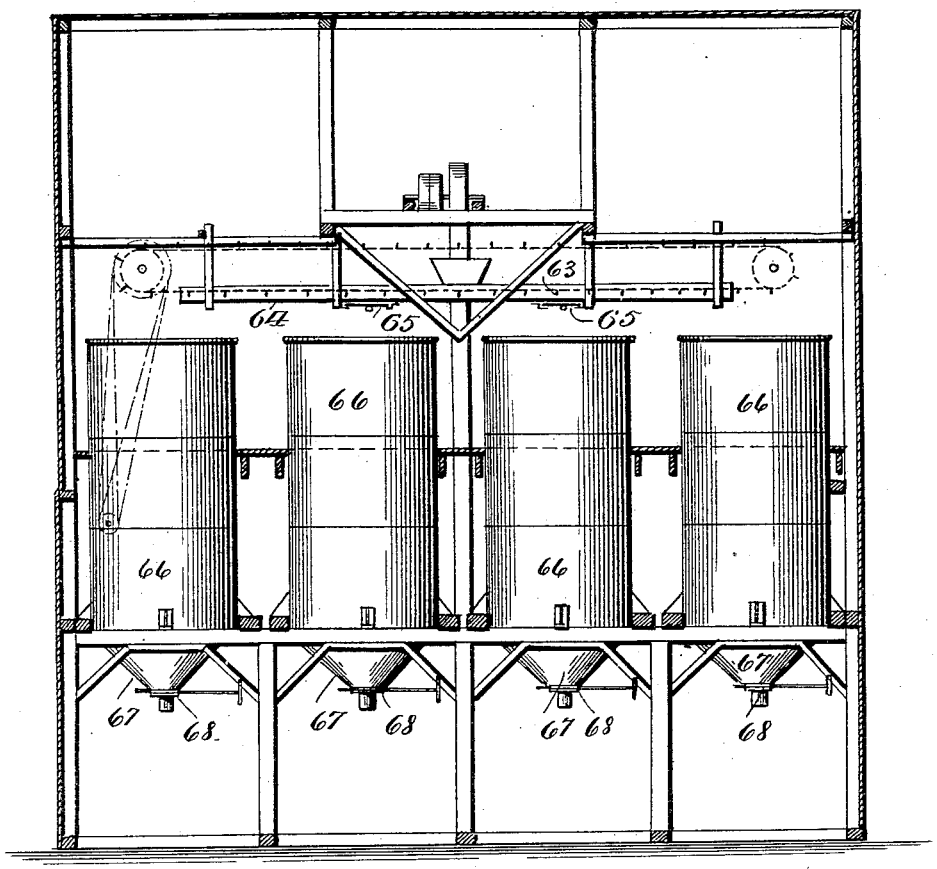

Figure 1 is a vertical longitudinal section taken through a mortar-making plant constructed in accordance with my invention. Fig. 2 is a plan section view of the same. Fig. 3 is a vertical transverse section upon the line 3 3 of Fig. 1. Fig. 4 is a section upon the line 4 4 of Fig. 3. Fig. 5 is a vertical transverse section taken through the mortar-mixing machine. Fig. 6 is a top plan view of the mortar-mixing machine. Fig. 7 is a side view of the mortar-mixing machine. Fig. 8 is a vertical transverse section taken through the lime-slaking tank or vat, and Fig. 9 is an enlarged detail of the slotted lever and its connections.

For convenience in operating a plant of this kind I preferably select a site for the same upon a river or water front, where a supply of water may be readily obtained, and the sand used may be conveniently delivered to the plant from scows or barges. In the accompanying drawings I have shown my plant as constructed adjacent to a riverfront and provided in the upper portion of the building with a water-tank, to which water is pumped from the river, the water being then conveyed through suitable pipes to the lime-slaking and mortar-mixing apparatus. As the particular arrangement of pipes for conveying the water and the method of pumping the water to the storage-tank may be of any approved construction, I have not deemed it necessary in this connection to specifically describe the same.

Reference now being had to the details of the drawings, 1 represents a sand scow or barge loaded with sand.
2 is a bucket or tub such as is ordinarily employed in unloading sand from barges, the same being shown as adapted to be hoisted from the barge and conveyed by a trolley or truck 7 up an inclined track to the point near the upper end of the track, where the bucket or tub automatically contacts with tripperarms 3 and discharges its contents into a storage-chamber 4, provided for the storage of the sand. The mechanism connected with the operation of the sand bucket or tub will be readily understood upon reference to Fig. 1 of the drawings. It will be seen that the chain or rope 5 which connects the bucket or tub with the trolley or truck passes upward over a traversing sheave 8 and thence around a winding-drum 9, said drum 9 being rotated by a friction-belt passing around pulleys 10 10', which in turn are driven by the cross line-shaft and rotated by belt-pulleys or bevel-gearing from the main line-shaft. A pivoted lever 11 is provided at its lower end with a friction-pulley 12, and the upper end of the lever is provided with a slotted lever or link 13. The lever 11 is pivoted in such a way that upon the tilting or pulling of the lever the friction-pulley 12 is thrown into contact with the belt connecting the pulleys 10 10'' with the drum 9, thus causing the drum 9 to rotate. When the lever is released, the friction-pulley 12 swings out of contact with the belt and the rotation of the drum 9 ceases.

14 is a pull or shifter rope connected at one of its ends to the pivoted lever 11, and at its other end, which is within convenient reach of the operator upon the sand scow or barge, it is provided with a suitable ring or handle 15. The empty bucket returns by gravity to the sand-scow under complete control of the operator by slight pulls upon the shifter-rope 14. If the pull or shifter rope 14 is not released by the operator when the bucket or tub 2 is in contact with the tripper-arms 3, the said tripper-arms 3 will move upward on the roller guides or channels A and engage the slotted lever or link 13 with the lever 11, releasing the friction-pulley 12 and acting as a safety-stop.

The sand-storage chamber 4 is provided at one of its lower corners with an outlet-gate 16, the gate being adapted to be opened or closed, as desired, by turning a hand-wheel 17. This outlet-gate 16 of the sand-storage chamber communicates with an endless-chain bucket elevator 18, which serves to convey the sand up an incline and discharge the same into a sand-hopper 19. This sand-hopper is gaged to always hold a specified amount of sand when heaping full—as, for instance, one hundred cubic feet. The outlet or discharge opening at the upper end of the sand-elevator is directly over the center of the sand-hopper, and it will be at once evident that when the sand has filled the hopper the excess above the upper edge of the hopper will form a conical pile, which when it reaches the outlet of the elevator will obstruct the same and prevent a further supply of the sand passing to the hopper, as is clearly shown in Figs. 1 and 3 of the drawings. It will be at once evident that the excess of sand which is carried upward by the elevator being unable to find an outlet to the sand-hopper will be returned to the lower end or boot of the elevator and repeated over and over again. It is proposed, of course, to stop the elevator by means of a shifting lever in the hands of the operator when the sand-hopper has been filled; but should for any reason the elevator continue to run after the sand-hopper has been filled no sand will be spilled or wasted, as the excess of sand carried upward by the elevator will always be returned. The sand-hopper, it will be observed, is located directly above the mortar-mixing machine 20, and a passage at the lower end of the sand-hopper, which communicates directly with the mortar-mixing machine, is controlled by a suitable gate 21.

In the drawings forming a part of this specification I have shown a plant provided with two sets of slaking apparatus, each consisting of a lime storage tank and slaker and connected to the lime-paste elevator, with controlling-gates upon each side, which while both sets are adapted for use in connection with a single mortar-mixing apparatus may be used alternately or independently of one another, my object in using two sets of lime storage tanks and slakers being to expedite the work, as it is at once evident that while one tank and slaker is in actual use the other set may be reloaded or cleaned and prepared for another charge of lime paste. The plant may be doubled or tripled, and so on, in capacity by additional sets of mixing and slaking apparatus arranged in line. As the tanks and slakers employed in sets are duplicates both in construction and in operation a description of one set will suffice to enable me to describe the operation of the plant.

The lump or raw lime is deposited upon a grating $21^X$, which grating is provided with meshes or openings of a size suitable to prevent the passage of very large pieces, which will be broken by mallet or other suitable means until small enough to pass through the openings. The lime thus screened is carried upward by an endless bucket elevator 22, which elevator passes over a pulley or sprocket-wheel 23. The lime thus carried upward by the elevator 22 is after passing over the pulley 23 thrown upon an endless horizontally-moving chain conveyer 24, which conveyer is provided with suitable slats or flights 25. This horizontally-moving flight conveyer 24 passes over pulleys or sprocket-wheels 26 26', driven by belt from a cross line-shaft and controlled by a shifter lever, and in turn imparts motion to the bucket elevator through a pair of gears on the elevator and conveyer shafts adjacent to the sprocket-wheels 23 and 26, meshing together and revolving the elevator-shaft in an opposite direction to the conveyer-shaft, as will be readily seen. 27 and 28 are tanks adapted to the storage of a certain amount of lime, and the horizonal conveyer box or trough 24, into which the lime is thrown from the elevator 22, is provided at points directly above the lime-tanks with gate-controlled outlets, through which the lime passes into the tanks. The lower ends of the lime-tanks are hopper-shaped, as shown at 29, and are each provided at the lower end of said hopper with a telescoping connection or spout 30, which is adjusted to measure a predetermined amount of lime. Each tank is also provided with a gate B, operated by a hand-wheel, by which the passage through the telescoping connection is closed after charging the lime into the lime-slaking tank or vat 31 in a conically-measured heap C. The lime-slaking tank or vat is provided with a rotary stirrer 32, which consists in the present instance of a shell or pipe 33, securely keyed at its upper end to a vertical shaft 34, the lower end of which shaft passes through an aperture in the bottom of the slaking-tank and is stepped in a suitable bearing 35 below the center of the tank. An inner shell or tubing 36 is provided, which extends from the bottom to the top of the tank and surrounds the central opening through which the shaft 34 passes. The shaft 34 has keyed to it at a point below the bottom of the tank a crown-wheel 37, which meshes with a bevel gear-wheel 40, by means of which the shaft 34 may be rotated, using any suitable driving mechanism, such as a shifting belt, as will be readily understood. The shell portion 33, which rotates with the shaft 34, has secured thereto the iron arms 33', which arms have wooden teeth securely inserted in the form of a rake, which serve as stirrer-arms when it is desired to stir or agitate the contents of the tank. The coarse screen D covering the outlet-opening serves to prevent unslaked lime or foreign substances from passing to the lime-paste elevator. The plug E is for the purpose of cleaning or washing out the slaker.

The mortar-mixing machine 20, Figs. 5, 6, and 7, consists of an elongated bowl-shaped metallic receptacle or vessel, which is suspended or held in place within a suitable supporting-frame. The bottom of this mixing-receptacle is slightly elevated or crowned along a line running through its longitudinal center, and upon the outer sides, at the transverse center of the mixing-receptacle, are gate-controlled outlet-passages 42 and 42'. At points below the horizontal center and on both sides of the vertical center of the mixing-receptacle are shafts 43 and 44. Bolted or clamped to the said shafts 43 and 44 are sets of flat steel or iron arms 45 and 46. These arms are arranged singly and staggered upon the shafts in opposite directions, and each shaft is provided with two sets or series of arms, each set arranged at right angles to the other set, and each set adapted to intermesh or pass between corresponding arms upon the adjacent shaft, the blades or arms of one set upon each of the shafts extending from the end to the center of the shaft or vessel, where they meet a set of blades arranged at right angles to the direction of the first-named blades. Both sets or series of arms 45 and 46 have their faces inclined and are arranged upon the shafts to which they are attached, so that the direction of the incline or angle of the blades upon either side of the longitudinal center of the shafts will be such as to mix and cause the material which is being operated upon by the blades to be worked or carried from the center of the tank or vessel toward each end by one shaft and from both ends toward the center by the other shaft, with the shafts rotating in one direction, thus causing the material to be thoroughly mixed into mortar. The rotation and right and left spiral action of the blades will cause the mortar to be conveyed in the direction of the gate-controlled outlet-openings 42 or 42', according to the direction in which the shafts are rotated, the rotation of the shafts in one direction tending to cause the material or mortar within the tank to be expelled through the outlet or gate 42' into the elevating mechanism, as will be seen by reference to Figs. 5 and 6, while a reversal in the direction of the rotation of the shafts will produce an exactly opposite effect and cause the material or mortar to be expelled at the outlet or gate 42 upon the other side of the center of the tank or vessel. The gates 42 and 42' are adapted to be opened or closed by means of suitable hand-wheels 49 and 50, which hand-wheels are attached to the outer screwed ends of rods 51 and 52, which are connected with the gates. The shafts 43 and 44 are provided with suitable gearing 53 and 54, to which power is applied by means of an intermediate shaft and pinion driven by pulleys and belts, said shaft being supported below the mixing tank or vessel. The reversal in direction is caused by the use of three pulleys, two of which are loose upon the shaft and the other tight. The tight pulley is alternately driven by a straight and a cross belt in the well-known manner.

55 is an adjustable hopper for the measuring of lime paste and is located at a point above the lime-slaking tanks or vats and also above the mortar-mixing machine and at a point between the same, being filled from the slaking tanks or vats by means of an endless bucket elevator 56, located between the slaking tanks or vats and which travels within a suitable casing 57 and conveys the lime paste flowing through the gate-controlled openings from the interior of the slaking tanks or vats to the upper end of the lime-paste hopper, having an outlet at the top through which the lime paste, which is conveyed upward by the buckets of the elevator, is fed into the hopper 55. This hopper 55 is provided at intervals of its height with overflow-openings 58, which are arranged at such certain distances apart as may be found necessary to measure an accurately-predetermined quantity of lime paste within the hopper level with the overflow-opening, and each of the openings is provided with a suitable plug or gate, so that the amount of paste contained within the hopper may be at once regulated by opening one or the other of the openings 58, as may be found necessary, in order to provide the exact amount of paste for use. An overflow trough or spout 59 is provided, which trough or spout communicates at its lower end with the interior of the casing of the elevator 56, and its upper end is adapted to be suspended directly beneath the overflow-opening which at the time may be in use, so that any excess of paste which may be carried by the elevator 56 and deposited within the paste-hopper will overflow through the opening to which the trough or spout is attached and be returned through said overflow-spout to the elevator. A continuous overflow F is provided near the top of the paste-hopper to connect with the elevator-casing. It is proposed, of course, to stop the elevator by means of a shifting lever in the hands of the operator when the lime paste hopper has been filled to the overflow-opening; but should the elevator for any reason continue to run after the hopper has been filled to the overflow-opening no lime paste will be spilled or wasted, as the excess will always be returned to the elevator. An open trough or spout 60 connects an outlet-passage at the lower end of the measuring-hopper with the mortar-mixing machine, a suitable plug valve or gate 61 being provided to regulate the passage of the lime paste through the trough or spout to the mixing-machine. A fine screen G is inserted near the bottom of the measuring-hopper to prevent the passage of any unslaked particles.

An endless bucket elevator 62 serves to convey the mortar from the mixing-machine to a conveyer 63, which conveyer extends horizontally along one side of the building, being inclosed within a suitable box or trough 64, said trough being provided with doors or gate-controlled openings 65, each directly above a mortar-storage tank 66, any desired number of storage-tanks being provided. The construction and operation of the mortar-conveyer 63 are in all respects similar to the lime-conveyer 24, except adapted to rotate in either direction, the same consisting of an endless belt or chain passed over pulleys or sprocket-wheels at opposite ends of the apartment, and the belt or chain being provided with slats or flights extending transversely across the face of the trough, said flights serving to scrape the mortar along the horizontal surface within the trough and to expel the same through the particular door or gate 65 which may at the time be open, the movements of the conveyer being controlled by reverse-motion belts and by tight and loose pulleys. It is at once evident that the mortar-storage tanks may be of any suitable or desired size, and they are preferably of substantially the form in which I have shown them, having a capacity of at least one day's output, being hopper-shaped at their lower ends, as shown at 67, and each provided with a suitable gate 68, controlled by a hand wheel or lever for regulating the outlet of the mortar to the wagon or other vehicle to which it may be conveyed.

From the foregoing description of the construction of my mortar-making plant the operation of the same will be at once evident. The sand is hoisted by the bucket 2 from the sand-scow or other source and is conveyed up the inclined track 5 until the bucket containing the sand reaches a point at which it is desired to dump the same into the sand-storage bin. When the bucket arrives at this point, the operator upon the sand-scow slackens hold on the ring or handle 15, and the friction-pulley 12, being thus thrown out of contact with the belt connecting the pulleys 10 and 10', causes the drum 9 to cease winding after the contents of the bucket have been dumped into the sand-bin. The tub or bucket then rights itself by gravity and returns to the operator on the sand-scow, who controls the movement of the bucket by slight pulls on the rope 14, acting as a brake. The gate 16 of the sand-bin is opened by means of the hand-wheel 17 through the telescoping connection or spout, and the sand enters the casing of the endless bucket elevator 18, whence it is carried to the sand-hopper 19. When the sand-hopper is filled, a conical pile of sand above the top of the hopper is formed, which obstructs further passage of the sand, and the surplus material carried upward by the elevator being unable to find an outlet is carried back by the buckets and the elevator stopped by a shifting lever in the hands of the operator. In preparing the lime paste the lime is first deposited upon the grating 21, whence it passes to the endless bucket elevator 22 and is thereby carried to the horizontal lime-conveyer 24, whence it is deposited in the lime-storage tanks 27 and 28, each of said tanks having a capacity equal to several days' supply of lime. The lime is supplied to the slaking tank or vat 31 in a predetermined quantity in the shape of a cone C by opening the gate in the outlet of the lime-storage tank, and water in indicated quantity is allowed to enter from the pipe system 75, connected with the water-tank in the upper part of the building. The lime thus supplied with water for slaking is allowed to remain within the slaking tank or vat for a period of time sufficient to insure the thorough slaking of all of the lime contained in the charge and until the lime paste produced by the slaking of the lime has become thoroughly cooled. Ordinarily this result will be accomplished within a few hours' time. When it is desired to stir or agitate the paste, the stirrer-arms within the slaking tank or vat are rotated and a sufficient quantity of water is introduced to reduce the lime paste to the proper consistency for use, and the gate controlling the outlet of the slaker tank or vat is then opened and the lime paste passes through the coarse screen to the endless bucket elevator 56 within the casing 57 and is deposited within the paste-hopper 55. The amount of paste which is fed at any one time to the paste-hopper will depend entirely upon the amount required for the particular kind and quality of mortar to be made, and the amount having been previously determined upon the overflow-trough 59 is so adjusted as to convey the overflow from the particular opening used in the paste-hopper to insure the amount required, and when the hopper has been filled to the point of overflow the excess of overflow is returned to the slaking tank or vat by the return movement of the elevator 56, said elevator being then stopped by means of the shifter-lever in the hands of the operator, as will be readily understood. The relative amount of sand and of the lime paste required for mixing the batch of mortar is now contained within the sand-hopper 19 and the paste-hopper 55, and it is only necessary to open the gates to permit the contents of the sand and paste hoppers, respectively, to be conveyed by gravity to the mortar-mixing machine. The shafts carrying the mixer arms or blades within the mixing-machine are set in motion and the lime paste and sand are thoroughly mixed into mortar. The peculiar arrangement of the shafts and their connecting-arms, as hereinbefore described, as will be at once evident, will serve to not only thoroughly mix the ingredients contained within the mixing-machine, but at the same time will tend to force the mixed material or mortar in the direction of the outlet-gate leading to the elevator, which serves to convey it to the mortar-storage tanks, or if a batch of colored mortar or some special or particular grade of mortar in smaller quantities is desired to be mixed and it is not desired that this special batch of mortar should be carried to the mortar-storage tanks it is simply necessary to reverse the direction of the rotation of the shafts within the mortar-mixing machine, when the tendency of the mixer arms or blades by reason of their peculiar form and mode of attachment to the shafts will serve to expel the mortar through the gate 42 upon the opposite side of the mixing-machine, which gate 42 communicates with a barrel or other receptacle provided to receive the mortar. The usual or standard grades of mortar having been thoroughly mixed the gate controlling the outlet 42 is opened and the mortar conveyed by means of the elevator 62 and horizontal conveyer 63 to the several mortar-storage tanks, as will be readily understood.

It is at once evident that the construction of the mortar plant may be varied to a considerable extent without departing from the spirit of my invention—as, for instance, the relative arrangement of the several tanks, elevators, and conveyers—and the particular form of gates controlling the outlets or passage-ways may be varied or changed at will, and the capacity of the tanks employed may also be varied.

The gist of my invention resides, first, in the provision of a simple, quick, and thorough method of measuring the ingredients composing the lime paste and the length of time allowed for the digestion of the bulk before stirring or using, thus insuring a perfect slaking of the lime; second, in the machine stirring or agitating and testing of the cold and thoroughly-digested lime paste immediately prior to using, thus insuring a uniform and proper consistency; third, in the simple and effective method employed for measuring the lime paste and the sand prior to depositing the same in the mixing-machine, thus insuring a uniform product at all times; fourth, in the mechanical storage of the complete mortar within elevated tanks provided with discharge-gates at the bottom, thus insuring a convenient and rapid loading of the mortar into delivery wagons or carts, and, finally, in the handling of all ingredients by simple, thorough, and practical mechanical methods from the time that the ingredients enter the factory until the completed mortar is discharged into the carts or wagons at an exceedingly small cost of production.

Having thus described my invention, what I claim to be new, and desire to secure by Letters Patent, is—

1. In a mortar-mixing apparatus, a chamber having its bottom crowned along its longitudinal center and having a gate-controlled outlet upon each side of the center in combination with two parallel shafts rotating within the chamber, said shafts carrying arms as described, each shaft being provided with two sets of arms, each set being adapted to intermesh with corresponding arms upon the adjacent shaft, the blades or arms of one set upon each shaft extending from the end to the longitudinal center of the shaft, there meeting a set of blades arranged at right angles to the first set and both series of blades having their faces inclined upon the shafts, the direction of the incline or angle of the blades on one shaft being such as to mix the material operated upon, and to carry the same by the rotation of the shaft from the center of the chamber toward each end and the direction of the incline on the other shaft to carry the material from both ends toward the center when the rotation of both shafts is in the same direction, substantially as described.

2. In a mortar-making plant, an elevator for raising the lime, a horizontal conveyer connecting with the elevator, storage-tanks to receive the lime, adjustable measuring-spouts connected to the lower ends of the tanks, two slaking-tanks below the lime-storage tanks, shut-off gates for controlling the flow of the lime to the slaking-tanks, the lime-paste elevator placed between the two slaking-tanks, a measuring vessel or hopper in which the elevator discharges the paste, a mixing-machine, a sand-hopper, and a means for filling the hopper, the parts being combined and arranged to operate, substantially as described.

3. A sand-hopper, an elevator connected therewith and provided with a downwardly-inclined spout at its upper end directly above the center of the hopper the distance between the spout and hopper being such as to cause the heaping of the sand in the hopper to close the spout and permit the surplus sand to be carried down by the elevator, substantially as described.

4. In a mortar-making plant, a suitable mixing-machine, provided with openings upon opposite sides, gates constructed to control the openings and the two stirrers combined with suitable operating mechanism which is adapted to be driven in either direction so that the mortar can be discharged from either side, substantially as specified.

5. In a mortar-making plant, a mixing-machine, an elevator extending therefrom, a conveyer arranged to operate either to the right or left, storage-tanks and gates arranged in the bottom of the storage-tanks, substantially as shown.

6. In a mortar-making plant, a sand-storage chamber or bin, an upwardly-inclined sand elevator or conveyer from the storage-chamber with a spout at the upper end thereof, a sand-measuring hopper beneath said spout whereby a certain quantity of sand is automatically measured in a natural conical-shaped pile at the top of the hopper the surplus sand being returned down the lower leg of the elevator, a gate at the bottom of the hopper to control the discharge of the sand into the mixing-machine, a mortar-mixer situated below the sand-measuring hopper, the parts being arranged to operate substantially as and for the purpose described.

7. In a mortar-making plant, a lime-elevator, a horizontal lime-conveyer connecting with the said elevator, storage-tanks to receive the lime, adjustable spouts connected at the bottom of tanks to automatically measure a certain quantity of lime by forming in a natural, conical heap in the slaking-vats directly below the spouts, shut-off gates to control the passage in adjustable spout, a slaking-vat below each lime-tank, a lime-paste elevator with gate-controlled passages connecting with slaking-vat whereby the paste can be discharged from the vat into the lime-paste-elevating mechanism, an adjustable measuring vessel or hopper into which the elevator discharges the paste, a mortar-mixing machine below the paste-hopper, a sand-hopper and a means for filling the sand-hopper, the parts being combined and arranged to operate substantially as and for the purpose described.

8. In a mortar-making plant, a mixing-machine consisting of a square or rectangular-shaped vessel or chamber having a bottom upwardly curved or crowned along a line drawn through its longitudinal center, a gate-controlled discharge-outlet on each side of the longitudinal center of the bottom at the transverse center of the vessel, a pair of parallel stirrer-shafts extending through the vessel one on each side of its longitudinal center, a spur-gear on each shaft, an intermediate shaft having a pinion meshing with the spur-gears on the first-mentioned shafts to rotate the two stirrer-shafts together in the same direction, a double set or series of inclined stirrer arms or blades on each shaft within the vessel, the first set of blades being staggered or arranged alternately in opposite directions and extending in parallel series from the end to the transverse center of the vessel, the other set of blades on the same shaft being at right angles and inclined at reverse or opposite hand to the first set, the blades on one shaft being the reverse to the blades on the other shaft, and blades on one shaft arranged to intermesh in a horizontal position with those on the other shaft when shafts are rotating, the direction of the incline or angle of each set of blades being such as to thoroughly mix the material operated upon and to carry the same from the center of the vessel toward each end, and from the ends toward the center, a set of tight and loose pulleys on intermediate shaft for straight and cross belts to revolve the shafts to the right or to the left and discharge the machine at the outlet-passage on one side or the other as required, the parts being combined and arranged to operate substantially as and for the purpose described.

9. In a mortar-making plant, a mortar-mixer, an elevator extending therefrom and connected with a discharge-opening on one side of mixing-machine, a set of mortar-storage tanks with gate-controlled openings at their bottoms to discharge the mortar into wagons or carts, a conveyer arranged above mortar-storage tanks, and adapted to operate either to the right or to the left with gate-controlled discharge-passage to each tank, the parts being combined and arranged to operate substantially as and for the purpose described.

10. In a mortar-making plant, a sand-bucket, a trolley to carry sand-bucket, an inclined track or runway, a winding-drum, a hoisting rope or chain from trolley to winding-drum, a traversing sheave, friction belt mechanism adapted to rotate winding-drum, a pivoted lever provided with friction-pulley at lower end, an operating rope or chain connected to upper end of pivoted lever and adapted to control the movements of winding-drum, a tripper-arm adapted to automatically dump the bucket, said tripper-arm being provided with guides for upward movement to be imparted by bucket, a slotted lever or link interposed between tripper-arm and pivoted lever adapted to automatically check the movement of the drum, a sand-storage chamber or bin, an upwardly-inclined sand elevator or conveyer from sand-storage chamber with spout at upper end, a hopper connected with spout of sand-elevating mechanism whereby a certain quantity of sand is automatically measured, a gate at bottom of hopper, a lime-elevator, a horizontal lime-conveyer connecting with the said elevator, lime-storage tanks, adjustable spouts having shut-off gates and connected at the bottom of tanks to automatically measure a certain quantity of lime, slaking-vats arranged in pairs, one below each lime-tank, a lime-paste elevator between each pair of slaking-vats with gate-controlled passages connecting with slaking-vats, an adjustable measuring vessel or hopper into which the elevator discharges the paste, a mortar-mixer having a bottom crowned along a line drawn through its longitudinal center below the paste-hopper, a gate-controlled discharge-outlet on each side of the bottom at the transverse center of the mixer, a pair of parallel stirrer-shafts extending through the mixer one on each side of its longitudinal center, a shaft intermediate of the stirrer-shafts below the vessel, a spur-gear on each of the stirrer-shafts to mesh with a pinion on the intermediate shaft, a double set of inclined stirrer arms or blades on each shaft within the vessel, the first set of blades being staggered or arranged alternately in opposite directions and extending from the end to the transverse center of the vessel, the other set of blades on the same shaft being at right angles to the first set, the blades on one shaft being the reverse to the blades on the other shaft and arranged to intermesh therewith, a set of tight and loose pulleys on intermediate shaft for straight and cross belts to revolve the shafts to the right or to the left and discharge the machine at the outlet-passage, on either side, an elevator connecting with discharge-opening on one side of mixer and extending upward, a conveyer connecting with discharge-spout of elevator, the same being adapted to operate either to the right or the left, with gate-controlled openings at bottom, a set of mortar-storage tanks with gate-controlled discharge-passages at the bottom, the parts being combined and arranged to operate substantially as and for the purpose described.

In testimony whereof I affix my signature in presence of two witnesses.

WILLIAM B. UPTON.

Witnesses:
SILAS P. KELLER,
FRANKLIN H. HOUGH.